April 15, 1969  R. F. STELZER  3,439,139
CONTROL VALVE
Filed July 18, 1967

INVENTOR
RAYMOND F. STELZER
BY
Joseph E. Papin

United States Patent Office 3,439,139
Patented Apr. 15, 1969

3,439,139
CONTROL VALVE
Raymond F. Stelzer, Bel Nor, Mo., assignor to Wagner Electric Corporation, Newark, N.J., a corporation of Delaware
Filed July 18, 1967, Ser. No. 654,234
Int. Cl. H01h 35/38
U.S. Cl. 200—82         11 Claims

ABSTRACT OF THE DISCLOSURE

A control valve for energizing a driver warning circuit upon the failure of one of the separate fluid pressures supplied thereto from a split system type master cylinder, and damping means in said control valve for obviating actuation thereof to energize said circuit upon the occurrence of transient differentials between the separately supplied fluid pressures.

This invention relates to split type braking systems and in particular to a control valve operable upon the failure of one of the split system fluid pressures supplied thereto to energize a driver warning circuit.

In the past driver warning or control valves, a switch operating piston was movable therein from a normal operating position toward opposed translated or switch actuating positions to energize an electrical driver warning circuit in response to oppositely directed differentials in excess of a predetermined value between the magnitudes of the separate fluid pressures supplied from a split system type master cylinder and acting on the opposed ends of said piston, and opposed contained springs were engaged with the opposed ends of said piston to impede the translatory movement thereof to the translated positions in response to differentials between the magnitudes of the separately supplied fluid pressures less than the predetermined value and to also impede such translatory movement in response to transient surges in the separately supplied fluid pressures. A disadvantageous or undesirable feature of such past control valves was that the spring rates of the opposed springs acting to impede translatory movement of the switch operating piston could not be accurately matched, particularly when such springs were pre-compressed in said valves; therefore, such translatory movement of the piston in one direction occurred at a differential between the magnitudes of the separately supplied fluid pressures different than that effecting such translatory movement of said piston in the other direction.

The object of the present invention is to provide a control valve which overcomes the aforementioned disadvantageous feature, and this, as well as other objects and advantageous features of the present invention, will become apparent in the specification which follows.

Briefly, the present invention embodies a control valve having displaceable means therein for comparing the magnitudes of separate fluid pressures supplied thereto from a split system type master cylinder, said displaceable means defining in said control valve opposed variable volume damping chambers and including other means to impede displacement of damping fluid between said damping chambers and dampen or impede displacement movement of said displaceable means in response to transient differentials between the magnitudes of the separately supplied fluid pressures acting thereon.

Figure 1:
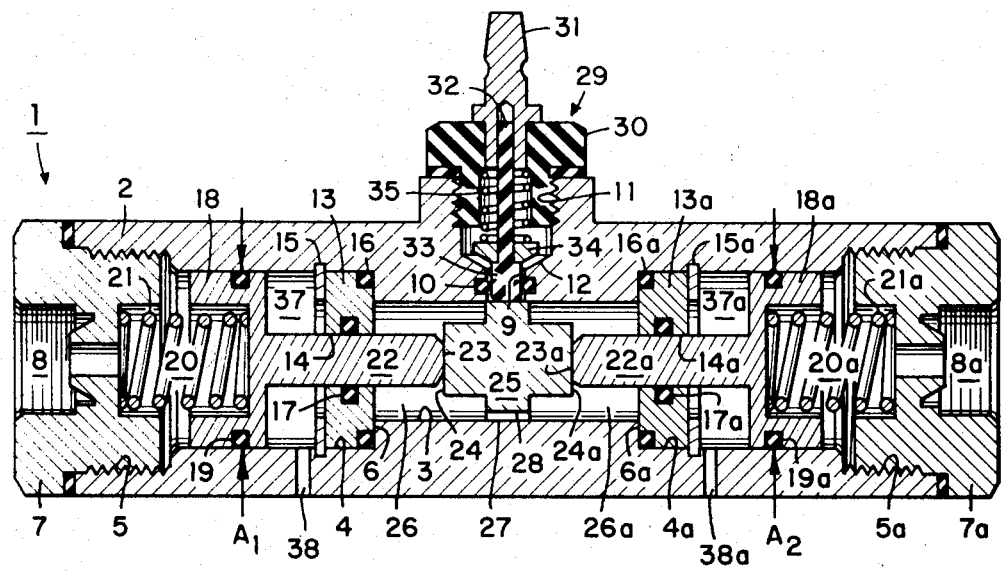
Figure 2:
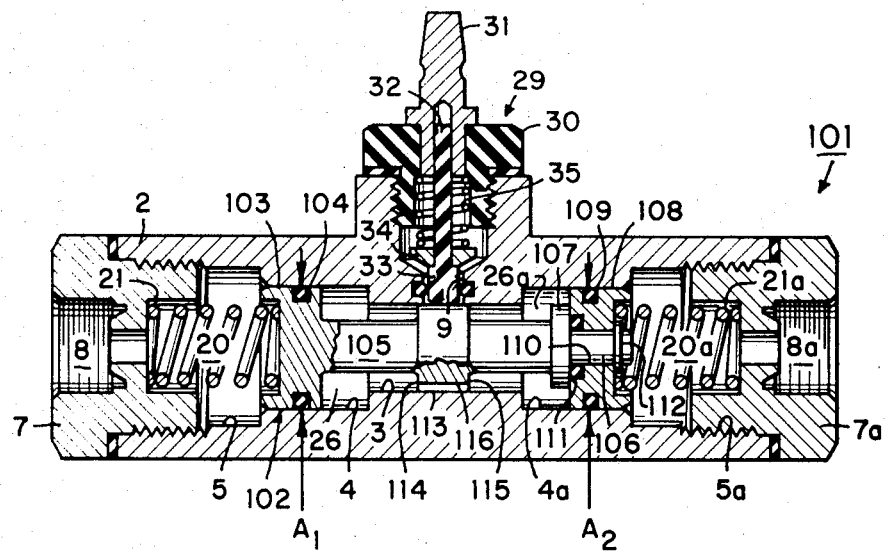

In the drawings which illustrate embodiments of the present invention and wherein like numerals refer to like parts wherever they occur, FIG. 1 is a sectional view showing a control valve embodying the present invention in cross-section; and FIG. 2 is another sectional view showing another control valve embodying the present invention in cross-section.

Referring now to FIG. 1 in detail, a control or driver warning valve 1 is provided with a housing 2 having a bore 3 therein interposed between opposed stepped counterbores 4, 5 and 4a, 5a, and opposed annular shoulders 6, 6a are defined on said housing at the juncture of said bore 3 with the counterbores 4, 4a, respectively. Closure members or end plugs 7, 7a having ports 8, 8a therein for respective connection with a split system type master cylinder well known in the art (not shown) are threadedly received in the cooperating counterbores 5, 5a, and a cross-bore 9 having a seal 10 disposed therein is also provided in the housing 2 having one end intersecting the housing bore 3 adjacent the mid-portion thereof and the other end thereof intersecting with a switch receiving or cross-counterbore 11 defining an annular switch contact shoulder 12 on said housing therebetween. Wall or separating members 13, 13a having bores 14, 14a therethrough are positioned in the housing counterbores 4, 4a in engagement with the housing shoulders 6, 6a by snap ring and groove assemblies 15, 15a, and seals 16, 16a and 17, 17a are respectively disposed in the peripheral portions of said wall members in sealing engagement with said counterbores and in said wall member bores. Switch pistons 18, 18a having peripheral seals 19, 19a disposed therein are slidably received in the housing bores 4, 4a and fluid pressure chambers 20, 20a are defined in said housing counterbores 4, 5 and 4a, 5a between said pistons and the end plugs 7, 7a in open pressure fluid communication with the ports 8, 8a. Pistons 18, 18a are provided with opposed effective areas $A_1$, $A_2$ substantially defined by the sealing engagement of the piston seals 19, 19a with the housing counterbores 4, 4a and responsive to the established or supplied fluid pressure in the chambers 20, 20a, and centering springs 21, 21a are disposed in said chambers between the end plugs 7, 7a and pistons 18, 18a urging said pistons toward their normal or centered positions in the housing 2. The pistons 18, 18a are also provided with integral axial extensions 22, 22a which are slidably received in the wall member bores 14, 14a in sealing engagement with the seals 17, 17a therein, and abutment or free ends 23, 23a of said extensions are provided in the housing bore 3 being urged by the compressive forces of the centering springs 21, 21a into abutting engagement with the opposed sides or faces 24, 24a of a switch positioning or damping member or piston 25.

The damping piston 25 divides the housing bore 3 into opposed variable volume damping chambers 26, 26a between the opposed faces 24, 24a thereof and the wall members 13, 13a, respectively, and said damping chambers are filled with damping fluid through the housing cross-bore and cross-counterbore 10, 11. A peripheral land 27 is provided on the damping piston 25 between the opposed faces 24, 24a thereof in sliding engagement with the housing bore 3, and the tolerance or slide-fit between the damping piston land 27 and housing bore 3 is predetermined to provide a restricted passage for damping fluid flow between the damping chambers 26, 26a upon reciprocal or translatory movement of said damping piston; however, for purposes of illustration, a restricted passage 28 of predetermined size is shown across the land 27 between the damping piston opposed faces 24, 24a to interconnect the damping chambers 26, 26a. The opposing substantially equal compressive forces of the centering springs 21, 21a acting through switch pistons 18, 18a tend to also maintain the damping piston 25 in its normal or centered position, as shown, with the land 27 thereof beneath the housing cross-bore 9. It should be noted that atmospheric chambers 37, 37a are defined in the housing between the pistons 18, 18a and the wall members 13, 13a which are vented by drain or vent ports 38, 38a, said atmospheric chambers also serving to divide the chambers 20, 20a from the damping chambers 26, 26a in the event that it is desirable to use a damping fluid having different or incompatible physical and/or chemical characteristics than that of the brake system (not shown).

An electrical switch, indicated generally at 29, includes a non-conductive closure plug 30 threadedly received in the housing cross-counterbore 11 having a metal terminal 31 extending therethrough, said terminal having an exterior end for connection in a driver warning circuit of a type well known in the art for selectively energizing a driver warning dash lamp (not shown). To complete the description of the control valve 1, a non-conductive switch member 32 is provided with a lower end or follower portion 33 slidable in the housing cross-bore 9 in sealing engagement with the seal 10 disposed therein and also in following or abutting engagement with the land 27 of the damping piston 25 to maintain a contact 34 carried on said switch member in spaced relation from the cooperating housing contact shoulder 12 against the compressive force of a switch spring 35 interposed in conductive relation between said contact and the interior end of the terminal 31.

In the operation with the component parts of the control valve 1 positioned as shown in FIG. 1 and as described hereinabove, independent or separately supplied fluid pressures $P_1$, $P_2$ normally having substantially equal magnitudes are supplied upon operator actuation of the split system type master cylinder (not shown) to the ports 8, 8a of said control valve and act on the areas $A_1$, $A_2$ of the switch pistons 18, 18a, respectively. Since the areas $A_1$, $A_2$ have previously been defined as substantially equal and since the fluid pressures $P_1$, $P_2$ are also substantially equal, it is obvious that substantially equal and opposite forces $P_1$, $A_1$ and $P_2$, $A_2$ are established across the switch pistons 18, 18a and the damping piston 25; therefore, since forces $P_1$, $A_1$ and $P_2$, $A_2$ are substantially self-cancelling, the switch pistons 18, 18a and the damping piston 25 are relatively unaffected by the separately supplied fluid pressures $P_1$, $P_2$ and will remain substantially in their centered positions, as shown.

In the event that a sustained differential is established between the separately supplied fluid pressures $P_1$, $P_2$ due to a malfunction in the split system master cylinder, leaks or the like, wherein the magnitude of the supplied fluid pressure $P_1$ exceeds that of the supplied fluid pressure $P_2$ by a predetermined value, the force $P_1$, $A_1$ acting on the switch piston 18 will, of course, overcome the opposing force $P_2$, $A_2$ acting on the switch piston 18a and effect concerted displacement of said switch pistons 18, 18a and the damping piston 25 from their centered positions rightwardly toward their rightward displaced or translated positions against the centering spring 21a. The rightward translatory movement of the damping piston 25 in the housing bore 3 decreases the volume of the variable volume damping chamber 26a while increasing the volume of the variable volume damping chamber 26 wherein damping fluid is displaced from said damping chamber 26a through the restricted passage 28 into said damping chamber 26, and the force created due to the restricted flow of the damping fluid through the restricted passage 28 impedes such concerted rightward movement of the switch pistons 18, 18a and the damping piston 25. Further rightward concerted movement of the switch pistons 18, 18a and the damping piston 25 is, of course, obviated upon the engagement of the piston 18a with the end plug 7a which defines the rightward translated or displaced position of said switch and damping pistons. Of course, it is obvious that when the magnitude of the supplied fluid pressure $P_2$ exceeds that of the supplied fluid pressure $P_1$ by a predetermined value, the force $P_2$, $A_2$ acting on the switch piston 18a will, of course, overcome the opposing force $P_1$, $A_1$ acting on the switch piston 18 and effect concerted displacement of said switch pistons and the damping piston 25 from their centered position leftwardly toward their leftward displaced or translated positions which is defined by the engagement of the switch piston 18 with the end plug 7. This leftward displacement movement of the damping piston 25 in the housing bore 3, of course, reduces the volume of the variable volume damping chamber 26 while increasing the volume of the variable volume damping chamber 26a; therefore, the damping fluid in the damping chamber 26 is caused to flow through the restricted damping piston passage 28 into the damping chamber 26a, and the force established upon the restricted flow of the damping fluid through the restricted damping passage 28 is effective to impede the concerted leftward movement of the pistons 18, 18a and the damping piston 25 in the same manner as previously discussed herein with regard to the rightward displacement movement thereof.

When the damping piston 25 is displaced from its normal centered position into its leftward or rightward displacement position, as described hereinabove, the land 27 thereof is, of course, moved from beneath the housing cross-bore 9, and the force of the switch spring 35 drives the switch member follower portion 33 into the housing bore 3 into locking engagement with either the damping piston opposed face 24 or 24a to positively maintain said damping piston in its rightward or leftward displaced positions, respectively, and also moves the switch contact 34 into electrical engagement with the housing contact 12 to complete the electrical circuit and energize the driver warning or dash lamp thereof (not shown). The locking engagement between the switch member follower portion 33 and the damping piston opposed face 24 or 24a prevents the concerted return of the damping piston 25 and the switch pistons 18, 18a to their centered positions in response to the compressive forces of the centering springs 21 or 21a acting thereon until the switch 29 is removed from the control valve 1. Upon the manual removal of the switch 25, the switch member follower portion 33 is manually removed from locking engagement with the damping piston opposed face 24 or 24a and the compressive force of the centering springs 21 or 21a acts through the pistons 18, 18a to concertedly return said switch and damping pistons to their centered positions in the housing 2.

In a split or dual fluid pressure braking system utilizing the split master cylinder, there may be momentary surge-type or peaking pressure differentials in excess of the desired or predetermined value between the supplied fluid pressures $P_1$, $P_2$ acting on the pistons 18, 18a, and such transient or momentary differentials are apt to be effected when the brakes are applied quickly and with a rather intense force, such as during a "panic" stop. This is because the pressure generated in the secondary pressure chamber of a conventional tandem or split master cylinder generally lags that in the primary chamber since the secondary master cylinder piston moves in response to the pressure in the primary chamber. From the foregoing, it is obvious that the force established upon the restricted flow of the damping fluid through the restricted passage 28 of the damping piston 25 between the variable volume damping chambers 26, 26a will impede or obviate transient concerted displacement of the switch pistons 18, 18a and the damping piston 25 in response to such transient surge-type or peaking differentials between the magnitudes of the supplied fluid pressures $P_1$, $P_2$ acting across said switch pistons 18, 18a.

Referring now to FIG. 2, another control or driver warning valve 101 is provided having substantially the same component parts and functioning in substantially the same manner as the previously described control valve 1 with the following exceptions.

A switch piston, indicated generally at 102, is provided with a head portion 103 which is slidably received in the housing counterbore 4, and a seal 104 is disposed in the peripheral portion of said head 103 in sealing engagement with said housing counterbore 4, said piston head portion 103 defining with the end plug 8 the chamber 20 in the housing counterbores 4, 5 and also engaging the centering spring 21. An extension 105 is integrally formed on the piston head extending coaxially through the housing bore 3 and counterbore 4 and having a reduced end portion 106 terminating in the counterbore 4a, and a radially extending flange 107 is integrally provided on said extension adjacent to said free end portion. Another head portion 108 having a peripheral seal 109 disposed therein is slidably received in the housing counterbore 4a, and an axial bore 110 provided through said piston head portion 108 receives the reduced end portion 106 of the extension 105. Another seal 111 is disposed between the piston head bore 110 and the extension end portion 106, and a snap ring and groove assembly 112 provided on said extension end portion retains the piston head 108 thereon against displacement, said piston head 108 defining with the end plug 7a the chamber 20a in the housing counterbores 4a, 5a and also being engaged with the centering spring 21a. A radially extending land portion 113 having opposed side faces 114, 115 is integrally provided on the extension 105 adjacent the midportion thereof and is slidably received in the housing bore, said land portion being positioned beneath the housing crossbore 9 when the switch piston 102 is in its centered position for engagement with the switch member follower portion 33. The land 113 defines with the piston head 103 the variable volume damping chamber 26 in the housing bore and counterbores 3, 4, and said land also defines with the piston head 108 the variable volume damping chamber 26a in the housing bore and counterbores 3, 4a. To complete the description of the control valve 101, the tolerance or slide-fit between the land 113 and the housing bore 3 is predetermined to provide a restricted passage for damping fluid flow between damping chambers 26, 26a upon reciprocal or translatory movement of the piston 102; however, for purposes of illustration, a restricted passage 116 of predetermined size is shown across the land 113 between the faces 114, 115 to interconnect said damping chambers.

From the foregoing, it is now apparent that novel control valves 1, 101 meeting the objects and advantages set forth hereinbefore, as well as other objects and advantages, is provided and that changes as to the precise configurations, shapes and details of the constructions set forth in the disclosure by way of illustration may be made by those skilled in the art without departing from the true spirit of the invention.

The embodiments of the invention in which an exclusive property or privilege is claimed are defined as follows:

1. A control valve comprising a housing, means for comparing the magnitudes of separate fluid pressures supplied to said housing and movable in said housing from a substantially normal position toward opposed translated positions in response to oppositely directed differentials in excess of a predetermined value between the magnitudes of the separately supplied fluid pressures acting thereacross, and said means defining with said housing movement damping means to impede movement thereof toward its translated positions.

2. The control valve according to claim 1, wherein said movement damping means comprises a pair of interconnected variable volume chambers for the restricted interchange of damping fluid therebetween.

3. The control valve according to claim 1, wherein said movement damping means comprises a pair of opposed variable volume damping chambers for damping fluid, and restricted passage means connected between said chambers for the restricted passage of damping fluid between said chambers upon the translatory movement of said first named means toward its translated positions.

4. The control valve according to claim 1, wherein said first named means comprises piston means having opposed portions respectively subjected to the separatley supplied fluid pressures, said movement damping means including a pair of variable volume chambers for damping fluid defined between said housing and piston means intermediate said opposed portions, and other means on said piston means defining with said housing passage means between said chambers to restrict the interchange of damping fluid therebetween and impede the translatory movement of said piston means toward its translated positions.

5. The control valve according to claim 1, comprising a pair of opposed wall means in said housing, said first named means including a pair of opposed piston means movable in said housing and each having an end portion respectively subjected to the separately supplied fluid pressures, extension means on each of said piston means respectively extending through said wall means, and other means movable in said housing between said wall means and in abutting engagement between said extension means, and said movement damping means including a pair of opposed variable volume chambers for damping fluid defined in said housing between said other means and said wall means, respectively, and restricted passage means connected between said chambers to restrict damping fluid flow therebetween and impede the concerted translatory movement of said piston means and other means toward their translated positions.

6. A control valve for use with a split system type master cylinder comprising a housing, first and second chambers in said housing respectively receiving separate fluid pressures supplied thereto from said split system type master cylinder, piston means movable in said housing between a normal position and opposed actuated positions including opposed portions in said first and second chambers and subjected to the separately supplied fluid pressures therein, and other means interconnecting said opposed portions, said opposed portions and other means being concertedly movable from the normal position toward the opposed actuated positions in response to oppositely directed differentials in excess of a predetermined value between the magnitudes of the separately supplied fluid pressures in said first and second chambers acting on said opposed portions, said other means also defining with said housing opposed variable volume third and fourth chambers for damping fluid between said opposed portions, and passage means defined between said other means and housing interconnecting said third and fourth chambers to restrict the interchange of damping fluid therebetween and impede the concerted movement of said opposed portions and other means toward the opposed actuated positions.

7. A control valve comprising a housing having a bore therein interposed between opposed counterbores, a pair of ports in said housing respectively connected with said counterbores and adapted to receive separately supplied fluid pressures from a split system master cylinder, piston means movable in said housing between a substantially centered position and opposed switch operating positions including a pair of opposed end portions slidable in said counterbores and respectively subjected to the separately supplied fluid pressures at said ports, extension means connected between said end portions, and flange means on said extension means and slidable in said bore, said piston means being movable from its centered position toward its switch operating positions in response to oppositely directed differentials in excess of a predetermined value between the magnitudes of the separately supplied fluid pressures acting on said opposed end portions, respectively, a pair of opposed variable volume damping chambers for damping fluid defined in said bore and counterbores between said flange means and said opposed end portions, respectively, restricted passage means connected between said chambers to impede the interchange of damping fluid therebetween upon movement of said piston means toward its switch operating positions and thereby impede such piston means movement.

8. A control valve comprising a housing having a bore therein interposed between opposed counterbores, a pair of ports in said housing connected with said counterbores and adapted to receive separately supplied fluid pressure from a split system type master cylinder, a pair of shoulders on said housing at the juncture of said bore with said counterbores, a pair of wall means maintained in said counterbores against displacement therefrom and in engagement with said shoulders, a pair of bores extending through said wall means and substantially coaxial with said housing bore, a pair of piston means slidable in said counterbores and defining therewith a pair of opposed chambers connected with said ports, respectively, a pair of opposed extension means on said piston means slidable in said wall means bore and extending coaxially through said counterbores into said housing bore, a pair of opposed abutment ends on said extension means in said housing bore, an abutment member slidable in said housing bore between said wall means and having opposed sides respectively engaged with abutment ends, a pair of centering springs biased between said housing and said piston means to urge said abutment ends into engagement with said abutment member and normally maintain said piston means and abutment member in a centered position in said housing, said piston means and abutment member being concertedly movable in one and opposite directions from their normal centered position toward opposed actuated positions against the return centering force of one of said centering springs in response to oppositely directed differentials in excess of a predetermined value between the magnitudes of the separately supplied fluid pressures acting on said piston means, a pair of opposed variable volume damping chambers for damping fluid defined in said housing bore between the opposed sides of said abutment member and said wall means, respectively, and passage means connected between said damping chambers for the restricted passage of damping fluid therebetween to impede the concerted movement of said piston means and abutment means in the one and other directions toward their actuated positions.

9. The control valve according to claim 8, comprising a pair of separation chambers defined in said counterbores between said piston means and wall means, respectively, and connected with the atmosphere.

10. The control valve according to claim 8, comprising a cross-bore in said housing having one end intersecting said housing bore adjacent to the mid-portion thereof, a cross-counterbore in said housing connecting with the other end of said cross-bore, an electrical switch for connection in an electrical circuit secured in said cross-counterbore, an operating member reciprocally movable in said switch, said operating member having a follower portion slidable in said counterbore for positioning engagement with said abutment member and movable into said housing bore for respective locking engagement with the opposed sides of said abutment member, sealing means between said cross-bore and operating member to isolate said cross-counterbore from the damping fluid in said housing bore, first contact means disposed in said cross-counterbore, second contact means on said operating member for circuit making engagement with said first contact means, electrical connection means in said switch having one end electrically connected with one of said first and second contact means and the other end thereof for connection in said circuit, spring means in said cross-counterbore engaged with said operating member to urge said second contact means toward said first contact means and said follower portion into positioning engagement with said abutment means when said abutment means is in the centered position, said operating member being movable in response to the compressive force of said spring means to move said second contact means into circuit making engagement with said first contact means and also move said follower end into said housing bore into locking engagement with one of the opposed faces of said abutment means against the return centering force of said one centering spring upon the concerted movement of said piston means and abutment means toward the actuated positions thereof.

11. A control valve comprising a housing, means having opposed portions thereon for comparing the magnitudes of separate fluid pressures supplied to said housing and movable in said housing from a substantially normal position toward opposed translated positions in response to oppositely directed differentials in excess of a predetermined value between the magnitudes of the separately supplied fluid pressures respectively acting on said opposed portions, and said means including movement damping means between said opposed portions and defining therewith a pair of interconnected damping chambers in said housing for the restricted interchange of damping fluid therebetween to impede movement of said first named means toward its translated positions.

References Cited
UNITED STATES PATENTS 1,588,657   6/1926   Christensen.
3,358,097   12/1967  Kersting _____ 200—82

ROBERT K. SCHAEFER, *Primary Examiner.*

H. BURKS, *Assistant Examiner.*